United States Patent [19]

Barnes

[11] Patent Number: 4,959,838
[45] Date of Patent: Sep. 25, 1990

[54] METHOD AND CIRCUIT FOR SHAPING LASER OUTPUT PULSES

[75] Inventor: Norman P. Barnes, Tabb, Va.

[73] Assignee: The United States of America as represented by the Administrator of the National Aeronautics and Space Administration, Washington, D.C.

[21] Appl. No.: 359,459

[22] Filed: May 31, 1989

[51] Int. Cl.$^5$ .................................................. H01S 3/10
[52] U.S. Cl. ......................................... 372/25; 372/30; 372/38
[58] Field of Search .............................. 372/25, 30, 38

[56] References Cited

U.S. PATENT DOCUMENTS

| | | | |
|---|---|---|---|
| 4,477,905 | 10/1984 | Sweeney | 372/25 |
| 4,630,275 | 12/1986 | Rapoport | 372/25 |

FOREIGN PATENT DOCUMENTS 0168979  7/1986  Japan .................................... 372/30

OTHER PUBLICATIONS

Koechner, W., Solid-State Laser Engineering, pp. 426-431 Jan. (1976).
Electronics Letters Jul. (1972), vol. 8, No. 15, pp. 369 and 370.
Optics Communications, vol. 65, No. 4 Feb. (1988), pp. 293-286.
IEEE Journal of Quantum Electronics, vol. QE-17, No. 9 Sep. (1981), p. 1656.
Quantum Technology, Inc., Short Form Catalog, (1-6) Aug. 81.

*Primary Examiner*—William L. Sikes
*Assistant Examiner*—Robert E. Wise
*Attorney, Agent, or Firm*—Harold W. Adams; John R. Manning; George F. Helfrich

[57] ABSTRACT

The invention is a method and circuit for shaping laser pulses 17' in which a laser medium 12' in a laser resonator 10' that includes a Q-switch 14' and polarizer 13' which act in combination to control the loss of the resonator 10' and provide the laser output 17' representative of such loss. An optical diode 22' senses the level of the output pulse 17' and provides an output signal 23' that when amplified is used with a control voltage from a supply 29' provide a control signal 19' which is applied to Q-switch 14' to control the shape of the output pulse 17' by adjusting its length.

12 Claims, 1 Drawing Sheet

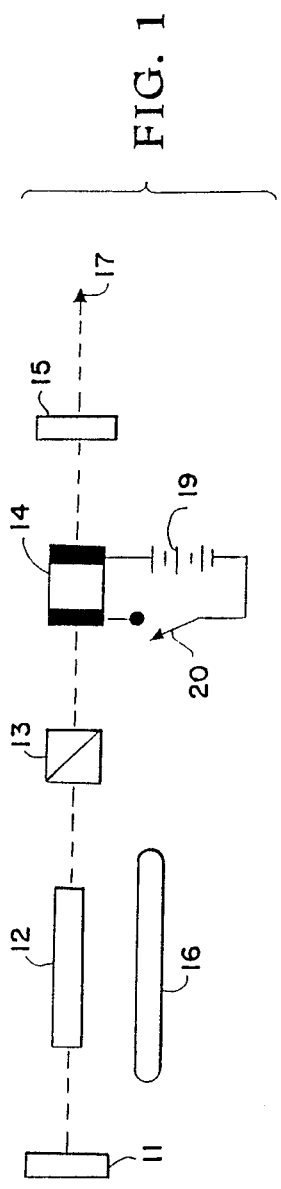
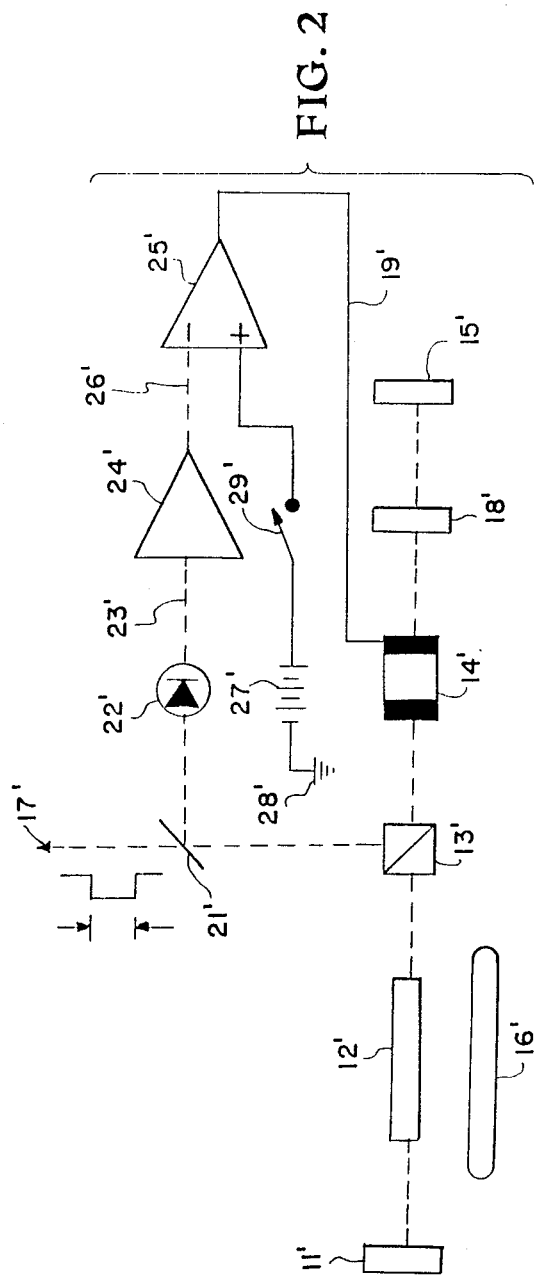

METHOD AND CIRCUIT FOR SHAPING LASER OUTPUT PULSES

CROSS-REFERENCE TO RELATED APPLICATIONS

This application is related to copending application Ser. No. 359460 filed May 31, 1989 entitled "Method and Circuit for Controlling the Evolution Time Interval of a Laser Output Pulse".

BACKGROUND OF THE INVENTION

1. Field of the Invention

This invention is a method and circuit for shaping laser output pulses and more particularly from a Q-switched laser device.

2. Description of the Prior Art

It is known to produce a high energy laser output having a long pulselength using a low energy laser oscillator that undergoes relaxation oscillations. While this method works, it is not very efficient. Essentially, only the energy in one of the relaxation oscillations is utilized while the rest is discarded. Other known methods such as the use of a conventional normal mode laser and an electro-optic switching system to slice out only a portion of the resulting pulse have proven to be even less efficient and less repeatable.

OBJECT AND SUMMARY OF THE INVENTION

An object of the invention is to overcome the limitations of the prior art by providing a novel method and circuit for producing laser energy more efficiently and with a shaped or controlled output pulse length.

BRIEF DESCRIPTION OF THE DRAWINGS

FIG. 1 illustrates a prior art method and circuit for achieving a long pulselength in a laser pumping device including a low energy oscillator which undergoes relaxation oscillations; and FIG. 2 illustrates a schematic of a preferred embodiment of the invention including an electro-optic element for producing long laser output pulses from a Q-switched laser device.

BRIEF DESCRIPTION OF THE INVENTION

Referring to the drawing, FIG. 1 represents a prior art laser resonator as generally designated by reference numeral 10 as including a totally reflecting mirror 11, an active or laser medium 12 such as to provide gain, a polarizer 13, an electro-optic switch 14, and a second partial reflector or mirror 15. In operation while the active laser medium 12 is being excited, the electro-optic switch or Q-switch 14 is adjusted so that any radiation entering the portion of the laser resonator which contains the Q-switch will undergo a change from linear polarization to circular polarization on the first pass. On the return pass, the circular polarization is converted to orthogonally polarized radiation that is reflected by the polarizer 13. Thus, with the switch 20 closed there is no feedback and laser oscillation (voltage 14 applied) will not take place.

In the operation of conventional prior art resonator 10, a pump source such as a flash lamp 16 excites the active laser medium 12. In this excited condition any photon simultaneously emitted along the axis 17 may cause laser action. However, in this configuration the polarizer 13 and Q-switch 14 acting in combination prevent laser action permitting only radiation polarized along a particular axis to pass through the polarizer 13. The resulting linearly polarized radiation that passes through the polarizer 13 is converted to circularly polarized radiation in passing through the Q-switch 14 when activated by a suitable volatage 19 by closing switch 20. Some of this circularly polarized radiation is reflected by the partial reflector mirror 15 back through the Q-Switch 14 in the reverse direction and converted to orthogonally polarized linear radiation which is rejected by the polarizer 13. Thus, no feedback results and no laser oscillation or action occurs.

By deactivating the Q-switch 14 (removing the voltage 19 by opening switch 20) the described conversion of the polarization in the electro-optic switch 14 no longer occurs and laser oscillation or action starts and the resulting laser output pulse 18 is extracted through the partial mirror 15. The length of the resulting output pulse 17 is determined essentially by the photon lifetime of the resonator 10 and the number of times over threshold as is known.

In accordance with a preferred embodiment of the invention as shown in FIG. 2, the action of a Q-switch 14' is controlled to provide a laser output 17' having a selectively variable output pulse length. As in the prior art circuit, during excitation of an active laser medium 12' there is no feedback of optical radiation in the resonator 10' formed by a total mirror 11' and a total mirror 15' which replaces the partial mirror 15 in FIG. 1. In the preferred configuration shown in FIG. 2, a quarterwave plate 18' also acts like a constantly activated Q-switch such as Q-switch 14 . Thus, when laser oscillation is desired a selected variable switching voltage 19' applied to Q-switch 14' negates part or all of the effect of the quarterwave plate 18' depending upon the amout of applied switching voltage 19'. Radiation rejected by the polarizer 13' passes through reflector 21' as a laser output pulse 17'. This is in contrast to FIG. 1 in which the laser output pulse 17 comes from the partial mirror 15.

While the conventional Q-switch 14 is activated or fully switched on or off by a full quarterwave voltage, a full quarterwave voltage 19' is not applied to the Q-switch 14' initially in accordance with the invention. Instead, it is applied over the duration d of pulse 17'.

In practicing the method, sufficient voltage 19' is initially applied to the Q-switch 14' to sustain laser oscillation at a low level. As the active laser medium 12' is depleted and the optical gain decreased, the voltage 19' applied to the Q-switch 14' increase due to the action of amplifier 24'. This provides more feedback and laser oscillation continues at a reduced optical gain level. As the optical gain decreases further, the voltage 19' is increased further and therefore the level of feedback output 23' is also increased to maintain laser output pulse 17' at a constant level. This action provides the desired controlled and longer pulse length d of the output pulse 17' which varies linearly with the power of that portion of the output pulse 17' received by photodiode 22', the output 23' of which is amplified by amplifier 24'. The gain of the amplifier 24' is adjusted so that the negative output 26' offsets the positive voltage 27' providing a variable positive output pulse 19' which activates Q-switch 14' and thus output pulse 17'. The voltage 19' varies over the duration of pulse 17' to maintain a constant output pulse 17'.

As shown in FIG. 2, the desired and controlled switching voltage 19' for operating the Q-switch 14' is applied from a conventional differential amplifier 25' to initiate and maintain laser oscillation. As this laser action continues, part of the resulting laser output signal 17' is detected by a suitable photodiode 22', the output 23' of which is amplified by a conventional amplifier 24' the output 26' of which is applied to the negative pin of the differential amplifier 25'. The positive voltage 19' required to initiate laser oscillations is applied to the Q-switch 14' through the differential amplifier is from a suitable battery 27' connected to ground 28' and to the positive pin of differential amplifier 25' through a suitable control switch 29'. If the level of the laser output 17' becomes too large, the positive voltage 19' applied to the Q-switch 14' to facilitate laser oscillation is negated by the amplified laser output 26'. By negating the applied positive voltage, the resonator provides less feedback which reduces the laser output 17'. As the optical gain decreases, the level of the laser output 17' also tends to decrease. This, in turn, provides less negative feedback 26', which tends to increase the optical feedback in the resonator. Thus the laser action tends to increase. Through proper adjustment of the operating parameters of the feedback system, such as the initial setting of voltage 27' and the gain of the amplifier 24', the duration d or length of laser output pulse 17' is controlled.

While a preferred and alternative embodiments have been described in detail, numerous changes and modifications may be made without departing from the invention which is to be limited only by the appended claims.

What is claimed is:

1. A method of shaping laser output pulses by controlling the length thereof comprising the steps of:
    pumping an active laser medium to initiate laser action in a laser resonator including a Q-switch and a polarizer acting in combination as loss elements to control the loss level of said laser resonator and a resulting laser output pulse thereof during said laser action;
    sensing and converting the level of said laser output pulse from said polarizer into a control signal; and
    applying said control signal to said Q-switch to vary the loss level of said laser resonator and said laser action to control the length and thereby the shape of said laser output pulse.

2. The method of claim 1 wherein the level of said laser output pulse is sensed photo-optically to produce a variable control signal.

3. The method of claim 2 wherein said variable output signal is an electrical output signal.

4. A method of shaping laser output pulses by controlling the length thereof comprising the steps of:
    pumping an active laser medium to start a laser action in a laser resonator including a voltage responsive Q-switch and a polarizer acting in combination as resonator loss level elements to variably control the loss level of said laser resonator and a resulting laser output pulse from said laser resonator during said laser action;
    applying a first variable voltage of an initial determined value to said Q-switch to set the loss level of said laser resonator to commerce laser action and initiate a laser output pulse;
    sensing and converting a portion of the level of said laser output pulse from said polarizer into a variable second voltage; and
    varying said first voltage from said determined value in response to said varible second voltage to vary the loss level of said Q-switch and thus the length of said laser output pulse.

5. The method of claim 4 wherein the level of said laser output pulse is sensed photo-optically to produce said variable second voltage.

6. The method of claim 5 wherein said variable second voltage is amplified in a first amplifier.

7. The method of claim 6 wherein the output of said first amplifier and thus and second variable voltage is compared with a third voltage equal to said initial determined value of said first variable voltage to provide said first variable voltage.

8. The invention as defined in claim 7 including a first amplifier means wherein said second variable voltage is amplified.

9. The invention as defined in claim 5 wherein said laser output pulse is provided from said polarizer.

10. The invention as defined in claim 9 including differential amplifier means for comparing said second variable voltage with a third fixed voltage equal to the initial determined value of said first variable voltage applied thereto to provide said first variable voltage.

11. In a laser resonator including a laser medium and a voltage responsive Q-switch and a polarizer acting in combination to establish the loss level of said resonator in response to a first variable voltage of an initial value applied to said Q-switch to initiate laser action and produce a laser output pulse upon the pumping of said laser medium, the improvement comprising:
    means for sensing the level of said laser output pulse upon its initiation and producing a second variable voltage responsive thereto; and
    means for varying said first variable voltage from said initial determined value in response to said second variable voltage for a determined duration thereby controlling the length of said laser output pulse.

12. The invention as defined in claim 11 wherein said means for sensing the level of said laser output pulse includes photo-electric means that provides said second variable voltage.

* * * * *